US008181714B2

(12) United States Patent
Randa

(10) Patent No.: US 8,181,714 B2

(45) Date of Patent: May 22, 2012

(54) PNEUMATIC IMPACT PIERCING TOOL

(75) Inventor: Mark D. Randa, Summit, WI (US)

(73) Assignee: Earth Tool Company, LLC, Oconomowoc, WI (US)

( * ) Notice: Subject to any disclaimer, the term of this patent is extended or adjusted under 35 U.S.C. 154(b) by 189 days.

(21) Appl. No.: 12/383,471

(22) Filed: Mar. 24, 2009

(65) Prior Publication Data

US 2009/0260842 A1 Oct. 22, 2009

Related U.S. Application Data

(60) Provisional application No. 61/070,556, filed on Mar. 24, 2008.

(51) Int. Cl.
*B25D 9/16* (2006.01)
*B23B 45/04* (2006.01)

(52) U.S. Cl. ............... 173/71; 173/73; 173/91; 173/136

(58) Field of Classification Search .................... 173/19, 173/71, 73, 91, 136
See application file for complete search history.

(56) References Cited

U.S. PATENT DOCUMENTS

| | | | | | |
|---|---|---|---|---|---|
| 4,054,180 | A | * | 10/1977 | Bassinger | 173/136 |
| 4,100,976 | A | * | 7/1978 | Stone | 173/133 |
| 4,194,435 | A | * | 3/1980 | Gaun et al. | 91/234 |
| 4,726,429 | A | * | 2/1988 | Kennedy | 173/62 |
| 5,025,868 | A | * | 6/1991 | Wentworth et al. | 173/91 |
| 5,322,136 | A | * | 6/1994 | Bui et al. | 175/65 |
| 5,337,837 | A | * | 8/1994 | Wentworth et al. | 175/19 |
| 5,465,797 | A | * | 11/1995 | Wentworth et al. | 173/91 |
| 5,494,116 | A | * | 2/1996 | Wentworth | 173/17 |
| 5,603,383 | A | * | 2/1997 | Wentworth et al. | 173/91 |
| 5,685,380 | A | * | 11/1997 | Purcell et al. | 175/215 |
| RE36,848 | E | * | 9/2000 | Bui et al. | 175/65 |
| 6,923,270 | B1 | | 8/2005 | Randa | |
| 7,066,279 | B2 | | 6/2006 | Randa | 173/91 |
| 7,273,113 | B2 | * | 9/2007 | Spektor | 175/19 |
| 7,469,751 | B2 | * | 12/2008 | Gien | 173/15 |
| 2006/0096769 | A1 | * | 5/2006 | Randa | 173/91 |
| 2010/0059277 | A1 | * | 3/2010 | Burke et al. | 175/21 |

* cited by examiner

*Primary Examiner* — Hemant M Desai
*Assistant Examiner* — Gloria R Weeks
(74) *Attorney, Agent, or Firm* — Tomlinson Rust McKinstry Grable

(57) ABSTRACT

A reversible, pneumatic ground piercing tool has a tail assembly with exhaust passages therethrough. At least a portion of each exhaust passage angles radially inwardly and ends in discharge ports that communicate with a central hole at the rear end of the tail assembly, whereby exhaust escapes through the central hole. A tail cone has a radially inwardly extending flange on the inner periphery of the central hole, which flange is rearwardly spaced from and covers the discharge ports.

3 Claims, 2 Drawing Sheets

PNEUMATIC IMPACT PIERCING TOOL

This application, claims priority of U.S. Provisional Application No. 61/070,556, filed Mar. 24, 2008.

TECHNICAL FIELD

The invention relates to pneumatic impact-type tools (moles) for boring holes in the ground.

BACKGROUND OF THE INVENTION

Randa U.S. Pat. No. 6,923,270, issued Aug. 2, 2005, the contents of which are incorporated by reference herein, describes a pneumatic ground piercing tool that includes a tail assembly including a tail nut and tail cap, the tail cap having a plurality of exhaust passages for exhausting spent compressed air. The discharge ports of the exhaust passages open into an annular space between a rearwardly opening recess of the tail cap and an air supply conduit such that the ports are shielded by a side wall of the tail cap from plugging when the ground piecing tool is operated in reverse mode. However, as shown in FIG. 9 of the patent, when seen from the rear view, the discharge ports are partly exposed. This permits dirt to enter the ports especially when the tool is operating in reverse mode. The present invention seeks to remedy this problem.

SUMMARY OF THE INVENTION

A reversible, pneumatic ground piercing tool according to the invention includes an elongated hollow body having a front nose and a rear opening. A striker is disposed for reciprocation within an internal chamber of the body to impart impacts thereto for driving the body through the ground. The striker having a rearwardly opening recess and a rear radial passage through a wall enclosing the recess, a front portion having a front bearing thereon for sliding contact with a first inner surface of the body and passages permitting flow of pressure fluid to a front, variable-volume pressure chamber ahead of the striker, and a rear portion having a rear bearing thereon rearwardly of the radial passage for sliding contact with a second inner surface of the body.

A stepped air inlet conduit, forming valve of the tool, cooperates with the striker within the internal chamber of the body to reciprocate the striker and impart blows to a front end wall of the internal chamber under the action of a pressure fluid fed into the rear recess in the striker, followed by reverse movement of the striker when the rear radial passage moves past a front edge of the step of the stepped air inlet conduit, and exhaust of compressed air when the rear radial passage moves past a rear edge of the step of the stepped air inlet conduit. A reversing mechanism is provided by which the tool is switched from forward to reverse travel and back.

A tail assembly is mounted in the rear opening of the body that secures the air inlet conduit in the body, wherein the tail assembly includes a tail nut threadedly secured in the rear end opening of the tool body and a tail cone disposed over the rear end opening of the tool body and secured to the tail nut. The tail nut has a lengthwise opening extending therethrough which opening opens rearwardly when the tail cone is in position over the tail nut. According to the invention, the tail assembly has exhaust passages therethrough, at least a potion of each exhaust passage angling radially inwardly. The exhaust passages end in discharge ports that communicate with a central hole at the rear end of the tail assembly, whereby exhaust escapes through the central hole. The tail cone has a radially inwardly extending flange on the inner periphery of the central hole, which flange is rearwardly spaced from and covers the discharge ports such the discharge ports cannot be seen in a direct rear view. In a preferred embodiment, each exhaust passage comprises a frontwardly opening, rearwardly extending first blind hole in the tail unit, which first blind hole is intersected by a second blind hole proximate the rear end of the first blind hole and perpendicular thereto, extending radially inwardly and forming the outlet port at the inner end thereof. These and other aspects of the invention are discussed further in the detailed description that follows.

DETAILED DESCRIPTION

Figures 1, 2:
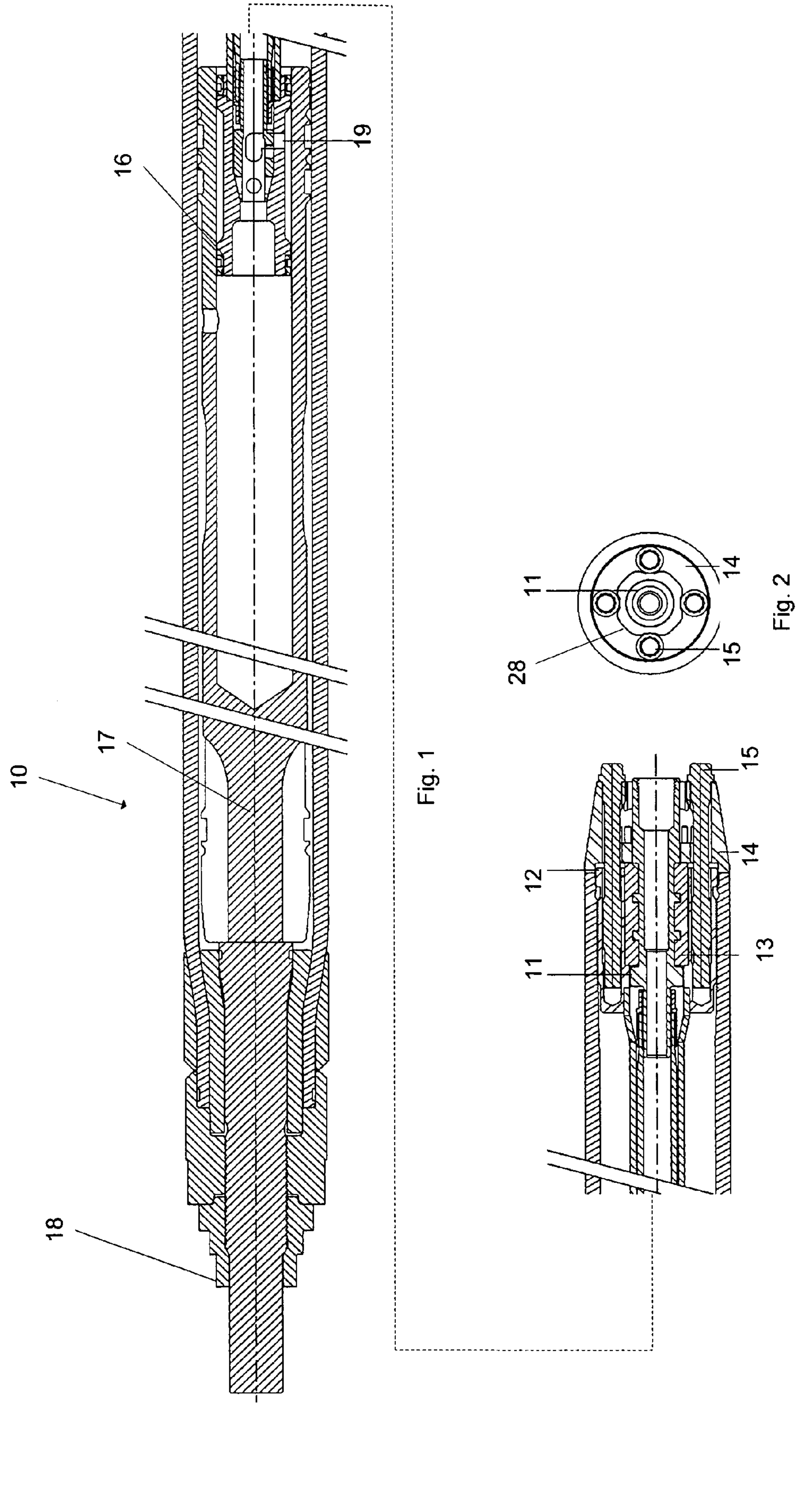
FIG. 1 is a lengthwise sectional view of a pneumatic impact tool of the invention.
FIG. 2 is a rear view of the tool of FIG. 1.
Figure 3:
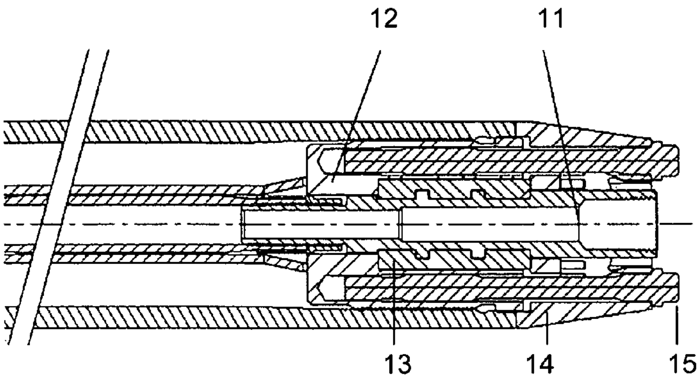
FIG. 3 is a further lengthwise sectional view (partial) of a pneumatic impact tool of the invention.
Figure 4:
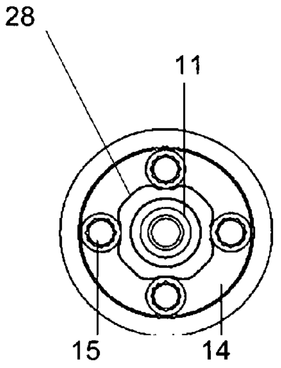
FIG. 4 is a rear view of the tool of FIG. 3.
Figure 5:
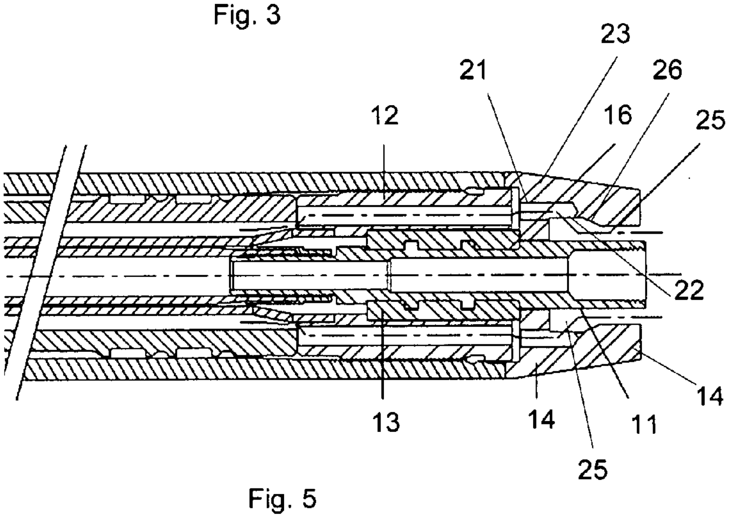
FIG. 5 is a further lengthwise sectional view (partial) of a pneumatic impact tool of the invention.
Figure 6:
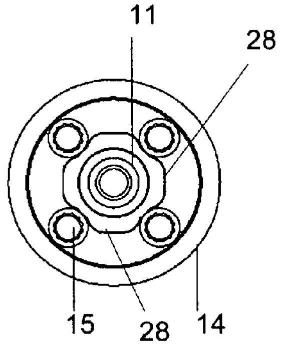
FIG. 6 is a rear view of the tool of FIG. 5.

Referring to the drawings, a tail assembly of the impact tool 10 includes forward and reverse stops 11, a rear anvil or tail nut 12, an elastomeric isolater 13, and a rear tail cone or cap 14 secured to the tail nut 12 by a set of tail bolts 15. The valve mechanism 16, striker 17 and nose 18 of the tool 10 as well as the reversing mechanism 19 may be of any known type, for example, using an air spring to reset the bit shaft as described in Randa U.S. Pat. No. 7,066,279, issued Jun. 27, 2006, the contents of which are incorporated by reference herein. The invention may be applied to both fixed head and movable chisel impact ground piercing tools.

The present invention provides an improved tail cap 14 wherein the exhaust passages 21 are formed so that the discharge ports 22 are completely hidden by the side wall 23 of the tail cap 14 when the cap 14 is viewed directly from behind. In one embodiment this is done by forming the passages in the lengthwise direction in the tail cone and then angling the passage 90° so that the passage opens and directs flow of exhaust in a radially inward direction. This may be done by drilling the exhaust passages as a series of straight blind holes with side openings at their front ends. The side openings are formed as the intersection between the blind holes and the front cavity of the tail cone. Such holes are much easier to form than the exhaust holes directed at an angle of less than 90 degrees shown in U.S. Pat. No. 6,923,270.

The exhaust then enters an annular space 25, which space 25 is preferably larger in diameter at its front end and then narrows at its rear end as shown in the drawings. The rear face 26 of the inner wall of this space at the boundary between front and rear sections of space 25 slopes inwardly in a front to rear direction in order to better direct the exhaust to the exit opening at the rear, acting as a continuation of the exhaust passages 21. The sloped portion at its rear end forms a radially inwardly directed flange 28 (see rear views) that overhangs and covers the outlet ports 22 of the exhaust passages 21. Flange 28 is preferably as a unitary flange that varies in shape, wider at the locations of the tail bolts 15 which are set between adjacent exhaust passages 21 and outlet ports 22. The invention can be described as providing several symmetrically spaced discharge ports and several flanges. This arrangement is more effective for preventing dirt from entering the exhaust passages than the one shown in U.S. Pat. No. 6,923,270 wherein the exhaust ports open rearwardly and are partially exposed in a rearward direction.

While certain embodiments of the invention have been illustrated for the purposes of this disclosure, numerous changes in the method and apparatus of the invention presented herein may be made by those skilled in the art, such changes being embodied within the scope and spirit of the present invention as defined in the appended claims.

The invention claimed is:

1. A reversible, pneumatic ground piercing tool according to the invention includes:

an elongated hollow body having a front nose and a rear opening;

a striker disposed for reciprocation within an internal chamber of the body to impart impacts thereto for driving the body through the ground, the striker having a rearwardly opening recess and a rear radial passage through a wall enclosing the recess, a front portion having a front bearing thereon for sliding contact with a first inner surface of the body and passages permitting flow of pressure fluid to a front, variable-volume pressure chamber ahead of the striker, and a rear portion having a rear bearing thereon rearwardly of the radial passage for sliding contact with a second inner surface of the body;

a stepped air inlet conduit which cooperates with the striker within the internal chamber of the body to reciprocate the striker and impart blows to a front end wall of the internal chamber under the action of a pressure fluid fed into the rear recess in the striker, followed by reverse movement of the striker when the rear radial passage moves past a front edge of the step of the stepped air inlet conduit, and exhaust of compressed air when the rear radial passage moves past a rear edge of the step of the stepped air inlet conduit;

reversing mechanism by which the tool is switched from forward to reverse travel and back; and a tail assembly mounted in the rear opening of the body that secures the air inlet conduit in the body, wherein the tail assembly includes a tail nut threadedly secured in the rear end opening of the tool body and a tail cone disposed over the rear end opening of the tool body and secured to the tail nut, the tail nut having a lengthwise opening extending therethrough which opening opens rearwardly when the tail cone is in position over the tail nut, wherein the tail nut has exhaust passages therethrough, at least a portion of each exhaust passage angling radially inwardly and ending in a blind discharge port that communicates with a central hole at the rear end of the tail cone, whereby exhaust escapes through the central hole, and the tail cone has a radially inwardly extending flange on the inner periphery of the central hole, which flange is rearwardly spaced from and covers the blind discharge ports.

2. The tool of claim 1, wherein each exhaust passage comprises a frontwardly opening, rearwardly extending first blind hole in the tail nut, wherein the first blind hole is intersected by a second blind hole proximate the rear end of the first blind hole and perpendicular thereto, extending radially inwardly and forming the outlet port at the inner end thereof.

3. The tool of claim 2, wherein there are several discharge ports at spaced positions intersecting the rear end of each first blind hole.

* * * * *